B. T. HENRY.

Improvement in Carriage-Springs.

No. 5,011. Reissued July 30, 1872.

Witnesses.
J. H. Shumway
W. A. Bull

Benjamin T. Henry
Inventor
By Atty.
Wm. E. Earle

AM. PHOTO-LITHOGRAPHIC CO. N.Y. (OSBORNE'S PROCESS.)

UNITED STATES PATENT OFFICE.

BENJAMIN T. HENRY, OF NEW HAVEN, ASSIGNOR TO THE HENRY SPRING COMPANY, OF WINSTED, CONNECTICUT.

IMPROVEMENT IN CARRIAGE-SPRINGS.

Specification forming part of Letters Patent No. 64,866, dated May 21, 1867; reissue No. 5,011, dated July 30, 1872.

*To all whom it may concern:*

Be it known that BENJAMIN T. HENRY, of New Haven, in the county of New Haven and State of Connecticut, has invented a new Improvement in Springs for Carriages; and we do hereby declare the following, when taken in connection with the accompanying drawing and the letters of reference marked thereon, to be a full, clear, and exact description of the same, and which said drawing constitutes part of this specification, and represents, in—

Figure 1:
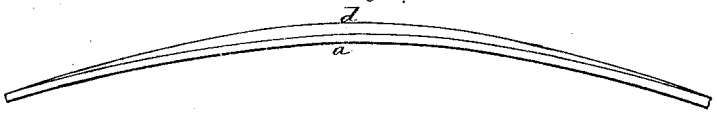
Figure 2:
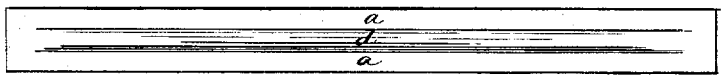
Figure 3:
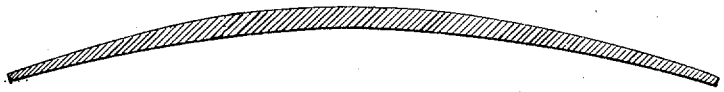

Figure 1, a side view; Fig. 2, a top view; Fig. 3, a longitudinal central section; and in Fig. 4, a transverse central section.

This invention relates to an improvement in springs for carriages and other purposes to which similar springs may be applied, and to that class of springs which have usually been formed of several layers or leaves, one upon the other. The invention is designed to avoid the great friction and wear which exist in carriage-springs, such as are formed from several leaves overlaying each other, as also to produce a spring of greater elasticity at less cost. The invention consists in forming the plate of the spring of nearly an equal thickness, and raising upon the surface one or more ribs, diminishing in height toward the end.

For convenience of illustration, in the drawing the invention is shown as applied to one-half of an elliptic spring; but it will be borne in mind that while illustrating this one construction the invention is applicable to all kinds of springs for carriages or other purposes which have been made by several leaves laid one upon the other.

I prefer to roll the spring in a common rolling-mill, one roll of which, for the spring illustrated, shall be of a circumference equal at least to the length of the spring to be rolled, and in the said roll there is formed a concave groove, beginning at nothing, and gradually growing deeper to the center, and then gradually diminishing to nothing at the place of beginning. Through rolls thus constructed the steel is passed, which forms a flat plate, *a*, and the groove in the one roll forming a rib, *d*, in the center, as seen in Fig. 4, the said rib diminishing in height from the center toward either end, as seen in Figs. 1 and 3, while the plate may be of nearly an equal thickness, and the rib sufficient to give the required strength to the single plate.

If preferred, more than one rib may be employed, and a flat leaf may be placed beneath the spring thus formed; or a leaf having upon its under surface a cavity corresponding to the rib may be placed upon the top for the purpose of strengthening the spring; yet it is better to make the rib and plate sufficiently strong, so as not to require the use of other leaves.

Other and perhaps better means than that described in the production of this spring may be employed; yet this plan is the best known to us.

Figure 4:
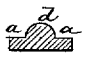

We have described the rib as having a convex surface, as seen in Fig. 4, and this is preferred, as it gives to the spring a neater and more finished appearance than would be were the rib of different form; yet the form of the rib is no part of this invention.

From this description of one-half of an elliptic spring those skilled in the art will readily understand its construction as applied to other classes of springs, such as full elliptic, C-springs, &c.

We claim as the invention of the said BENJAMIN T. HENRY—

A plate-spring having one or more ribs, *d*, formed upon its surface, substantially as set forth.

THE HENRY SPRING CO.,
By JOHN G. WETMORE,
*President.*

Witnesses:
JNO. D. PATTEN,
JOHN E. EARLE.